Dec. 6, 1955  E. F. RIOPELLE ET AL  2,725,755
POWER TRANSMISSION CHAIN DRIVE
Filed Nov. 16, 1950  8 Sheets-Sheet 1

Inventors:
Earl F. Riopelle and
Norman C. Bremer
By Edward C. Hertzlaugh
Atty.

Inventors:
Earl F. Riopelle and
Norman C. Bremer

Dec. 6, 1955    E. F. RIOPELLE ET AL    2,725,755
POWER TRANSMISSION CHAIN DRIVE
Filed Nov. 16, 1950    8 Sheets-Sheet 4

Inventors:
Earl F. Riopelle and
Norman C. Bremer

Dec. 6, 1955  E. F. RIOPELLE ET AL  2,725,755
POWER TRANSMISSION CHAIN DRIVE
Filed Nov. 16, 1950  8 Sheets-Sheet 5

Inventors:
Earl F. Riopelle and
Norman C. Bremer

Inventors:
Earl F. Riopelle and
Norman C. Bremer

United States Patent Office 2,725,755
Patented Dec. 6, 1955

2,725,755

POWER TRANSMISSION CHAIN DRIVE

Earl F. Riopelle, Detroit, Mich., and Norman C. Bremer, Ithaca, N. Y., assignors to Morse Chain Company, Ithaca, N. Y., a corporation of New York Application November 16, 1950, Serial No. 196,011

2 Claims. (Cl. 74—229)

This invention relates to new and useful improvements in chains adapted for extra heavy duty and particularly chains of that character which can be run at high speed.

Otherwise stated, the invention is embodied, generally, in chain drives, and particularly to that type of chain drive wherein the chain is comprised of a series of toothed links connected by pivot pins, and is directed particularly to improvements in the joints thereof.

More specifically stated, it is a general object and accomplishment of the invention to provide improvements in the inverted tooth or silent type of power transmission chains which makes possible true tangential engagement to and from the sprocket teeth thus eliminating the chordal speed changes usually associated with chains of this type.

Chains of any type when running on rapidly rotating sprockets may develop noise and vibration at certain speeds while running quite smoothly at other speeds. Periodic shocks or changes in velocity or direction as the chain meets the sprocket may create effects under high speed condition and heavy load which are highly objectionable in certain classes of service. To meet such service in an effective manner, many factors must be considered, and it is especially desirable to eliminate or offset all factors that tend to introduce vibrations or periodic shocks, however slight.

The ordinary chain, in running on a sprocket, does not meet it exactly tangentially, but engages a sprocket tooth somewhat before the point of tangency, and is then carried slightly upward and over the top of the sprocket before it settles into final engagement and is carried down around the sprocket. While the up and down motion thus transmitted to the free chain is very slight, yet it is periodic in character, occurring with each tooth, and may build up objectionable vibrations. It is therefore, desirable, both theoretically and practically, to make a chain which will travel more truly on a straight line during the process of engagement with a sprocket tooth; so that whatever the motions given the parts in contact with the sprocket, the free portions of the chain will receive merely a straight line pull.

A purpose of the present invention is to improve drive chains along these lines, particularly by providing means for regulating the center of articulation in a definite and positive manner during the engaging period so that the chain action will be more smoothly on and off the sprocket.

Another object resides in the provision of a chain drive in which acceleration of the chain during initial engagement with the sprocket over the normal speed of the chain is substantially eliminated.

Still another object is to control the action of the bearing and wearing surfaces as to regulate wear.

A particular object and accomplishment of this invention is to provide a chain drive in which the chain moves at a substantially constant linear velocity and the driven sprocket rotates at a constant angular velocity when the angular velocity of the driving sprocket is constant.

Another object of this invention is to provide a chain which substantially eliminates chordal action.

Another aspect of the invention is to provide a chain such that the hobbing equipment for generating sprocket teeth to cooperate therewith may be used for cutting any number of teeth from a predetermined minimum to infinity.

Another object and accomplishment of our invention is the provision of an improved arrangement whereby the chain has limited and controlled articulation.

Another important object of our invention is to improve the kinematic action of the joint by providing a more gradual transition from straight to rotary motion as the chain engages the sprocket and thus provide a quiet and smooth running chain.

The invention contemplates the provision of a chain to be employed in the transmission of power, particularly of the loose jointed or free jointed type, that is, chains in which the pintles on which a link turns are relatively loose in the pintle holes of the adjacent link. Various examples of such chains have been produced in the past, but have had only limited successful application. We have studied the construction and operation of these chains in an endeavor to ascertain the reasons for their lack of success, and believe that the difficulties are due to several causes which may be specified as follows: (1) where the pintle hole was straight-sided it was not tilted, and the joint was not properly self-restoring; (2) where the hole was tilted it was on a curve whose radius was substantially a pitch link, and as no means was provided to control the excessive drop, premature engagement of the next link resulted; (3) the joints have had too much clearance or freedom in the inward or downward direction, which we have discovered is undesirable in such joints, while a limitation of action to less than the natural drop will improve their operation; and (4) the wear has tended to be excessive.

Accordingly, further objects of our invention are to provide a chain sprocket drive which will be inexpensive in manufacture, silent, and wherein a substantially constant speed relation between the chain and the sprocket will prevail and to so relate the working basis of the chain teeth and the sprocket teeth so that the chain will enter and leave the sprocket substantially along a tangent to the pitch circle, thereby substantially avoiding longitudinal and transverse vibration of the chain.

In this connection, it is another object of the invention to provide a chain and sprocket combination wherein the working surfaces on one are generated with respect to the working surfaces on the other, thus obtaining opposed working surfaces which are conjugate one to the other.

Due to the present day rapidly increasing high speed and high power requirements by the oil well industry, a real demand has developed for chains of greater driving capacity in a limited space; i. e., a more compact, rugged chain that can be run at high and low speeds over sprocket wheels of relatively few teeth with unusually heavy loads and shock requirements.

Heretofore, the oil well industry has employed roller chains to meet their chain drive requirements; however, the high speed operation of heavier roller chains of standard design, running on sprocket wheels of few teeth, introduces higher destructive shock values which definitely lessen the durability and reliability of such chains. Therefore, standard chain designs are not entirely adequate to meet the present day requirements of the heavy duties of oil well hoist drive and engine compounding arrangements.

In this connection, it is an object and accomplishment of the invention to provide a drive chain which will run onto or mesh with a drive sprocket, having few teeth, under driving tension without any joint articulation occurring until the chain actually starts to partake of the angular motion of the sprocket and with the linear velocity of the chain coinciding with the angular velocity of the sprocket, thereby materially lessening the shock of meshing and the tendency to wear the driving teeth and resulting in smoother and more quiet operation.

More specifically stated, it is a further object and accomplishment of our invention to direct and control the motion of the driving joint picked up by the sprocket tooth as the chain engages the sprocket, so that it is carried inwardly toward the sprocket in the initial stages of engagement to offset the normal outward motion, with the result that the chain in going from the straight run to the run over the sprocket takes a form more nearly curved than polygonal, whereby whipping is reduced and the shortening effect thereof upon the effective life of the chain is minimized.

An ancillary object and accomplishment of the invention is to provide a new and improved chain drive assembly which is adapted to be economically manufactured and which is so designed as to permit the manufacture and assembly thereof in accordance with present day large scale mass production manufacturing methods of construction and assembly.

The invention seeks, as a final object and accomplishment, to provide a chain drive assembly particularly characterized by a design arrangement to more advantageously and satisfactorily perform the functions required of it and adapted to provide a compact unit which will successfully combine the factors of structural simplicity and durability, and yet be economical to manufacture.

Additional objects, features and advantages of the invention disclosed herein will be apparent to persons skilled in the art after the construction and operation are understood from the within description.

It is preferred to accomplish the various objects of this invention and to practice the same in substantially the manner as hereinafter more fully described, and as more particularly pointed out in the appended claims.

Embodiments of the invention are illustrated in the accompanying drawings forming a part hereof and wherein.

The drawings are to be understood to be more or less of a schematic character for the purpose of illustrating and disclosing a typical or preferred form of the improvements contemplated herein and in the drawings like reference characters identify the same parts in the several views.

Heretofore, it has been axiomatic that the engagement of a series of jointed links for a chain when in engagement with a wheel or sprocket that is being rotated at a constant velocity must create at some portion of the cycle a change in linear velocity of the chain.

Figures 1, 2:
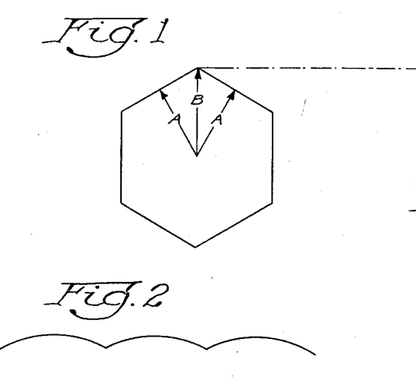
Fig. 1 illustrates a polygon figure to diagrammatically define the action of a conventional chain upon a conventional sprocket.
Fig. 2 illustrates in graphic form the sine line imparted by the action of a conventional chain being wrapped upon a conventional sprocket.

The speed characteristic of a usual type of conventional roller or silent chain engaging a tooth wheel or sprocket is almost identical to that of a steel tape which would be driving or be driven by a polygon shaped wheel as shown in Fig. 1. The speed characteristics of this system might be described graphically as shown in Fig. 2. A tape at one instant is moving at a velocity described by radius A, then accelerates until it is moving at a rate equal to radius B, then decelerates to A again.

Figure 3:
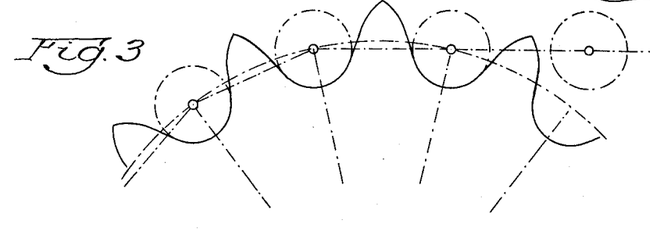
Fig. 3 illustrates the action of a conventional roller and/or silent chain when wrapped upon a conventional sprocket.

The action of a roller or silent chain might be shown as illustrated in Fig. 3. It will be noted that the change of velocity occurs with the chain when the major portion of the load is being transmitted to or from the sprocket teeth. This chordal action or, as it is sometimes described, chordal rise and fall of the chain, sets up not only impact stresses in the chain parts due to the hammer blow action of the links but also because of the rapid variation in velocity of the chain which is being resisted by the inertia of the driving or driven masses create severe pulsating and rapidly recurring tensile stresses in the links of the chain. These loadings seriously reduce the effective transmissibility of the power in the chain and, if not offset by sufficient added strength in the chain, will result in fatigue failure of the parts.

Many attempts have been made to compensate or neutralize the effect of chordal action. Our invention contemplates making either the links of the chain or the sprocket teeth of a curved form which in action would simulate the action of a gear engaging a rack. It has been found that such measures are quite effective, and when applied to chain drives, result in quieter operation and a marked increase in the chain power transmitting ability due to the lessened speed changes or velocity pulses in the strand of the chain between the sprockets.

In general, we propose to generate the working surfaces of the sprocket tooth with respect to the various positions of chain tooth contemplated by this invention, or to generate the working surfaces of the chain tooth with respect to the working surfaces of the sprocket tooth, so that as one rotates into and out of engagement with the other, the surfaces are conjugate one to the other. The result is a chain drive having chain teeth and sprocket teeth in driving relation one with the other, wherein, instead of having two more or less flat surfaces moving into contact with one another along generally normal lines and thereby setting vibrations and noise by impact, we will have opposed curved surfaces coming into contact one with the other with a combined rolling and sliding action.

This further results in a chain sprocket drive wherein, by the inter-relation between these conjugate surfaces (Fig. 18), the chain tends to enter and leave contact with the sprocket along a line tangent to the pitch circle, instead of approaching along a line other than the tangent and seeking the pitch circle as contact takes place.

Figure 4:
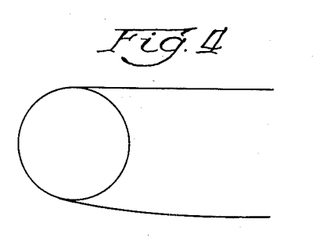
Fig. 4 graphically illustrates a belt engaging a smooth pulley which imparts the action desired in silent chain applications.
Figure 5:
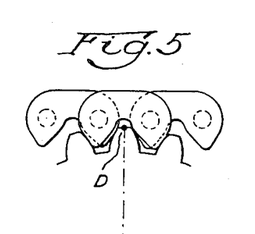
Fig. 5 diagrammatically illustrates the chain constructed as a rack and the sprocket as a gear in order to give true constant chain action.

Graphically, the action that is always desired may be that of a belt engaging a smooth pulley as shown in Fig. 4. As stated hereinbefore, prior chains were constructed so that at some portion of the cycle of a chain engaging a sprocket, there was a change in velocity, consequently the Utopian condition shown in Fig. 4 could not be realized. It is possible, however, to construct the chain as a rack and the sprocket as a gear and get true constant chain action if the chain is allowed to travel in a straight line as illustrated in Fig. 5.

Any attempt, however, to flex the chain after it leaves point D around the curved portion of the sprocket is bound to result in a variation in the velocity of the chain during the time that the joint is flexing or articulating. The amount of change in velocity, of course, is directly proportionate to the pitch of the chain.

Figure 6:
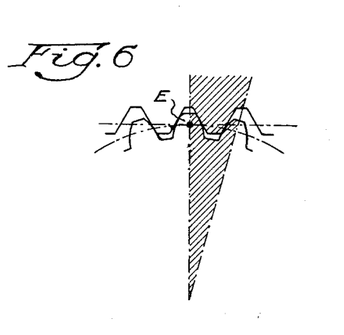
Fig. 6 graphically illustrates the mechanics of a gear in engagement with a rack.

The mechanics of a gear in engagement with a rack are such that actual transfer of pressure or energy is during a portion of the cycle shown by the shaded portion in Fig. 6.

Properly to develop a chain and sprocket combination which would similate a gear rack action, it is necessary that contact with the chain occur at points at either side of the tangent point E as shown in Fig. 6. From this, it will be understood that a chain link having a rack form and in engagement with a gear shaped sprocket must be of a form and of such dimension that contact with the sprocket teeth occurs considerably ahead of the actual tangency point of the sprocket and chain.

A study of the action of a chain and sprocket of such design revealed that the velocity of the chain remains constant for exactly half of the period of joint articulation, this being the portion of the cycle when the chain is approaching the tangency of the sprocket. During this time, the actual effective radius of the sprocket changes; the largest effective radius being at the instant of engagement, the minimum effective radius being when the joint has articulated one-half of its normal cycle.

This change in effective radius is the reason that a chain contemplated by this invention does not exhibit the characteristic chordal action and behaves more like a gear with true linear velocity characteristics. As has been hereinbefore stated, one of the undesirable characteristics of silent chains in use prior to our invention is known in the art as chordal action, and this is effectively overcome by our invention. A chain which approaches a sprocket along a path other than the line tangent to the pitch circle is finally forced into general conformity with the pitch circle by contact with sprocket teeth and the transverse movement of individual links resulting therefrom is transmitted to the approaching link, thus causing their paths of approach to the sprockets to be a wave something like a sine wave illustrated in Fig. 2. This chordal action gives the chain a varying linear velocity together with transverse motion. Chordal action may be easier to visualize if we consider the reverse condition of rolling a sprocket, which is equivalent to the pitch polygon illustrated in Fig. 1, on a plain surface. The axis of the sprocket would then have the wave motion which is normally imparted to the chain. Mathematically, the amplitude of the transverse motion of the earlier form of chain is equal to the versed sine of the angle 180 degrees divided by the number of teeth in the sprocket.

Chains made in accordance with our invention using conjugate working surfaces have none of these undesirable characteristics. Its entrance on to a sprocket is substantially along a line tangent to the pitch circle so that its linear velocity is substantially uniform, and transverse motion is absent. Noise due to impact is therefore reduced and internal stresses set up in the links are reduced to a minimum.

Figure 7:
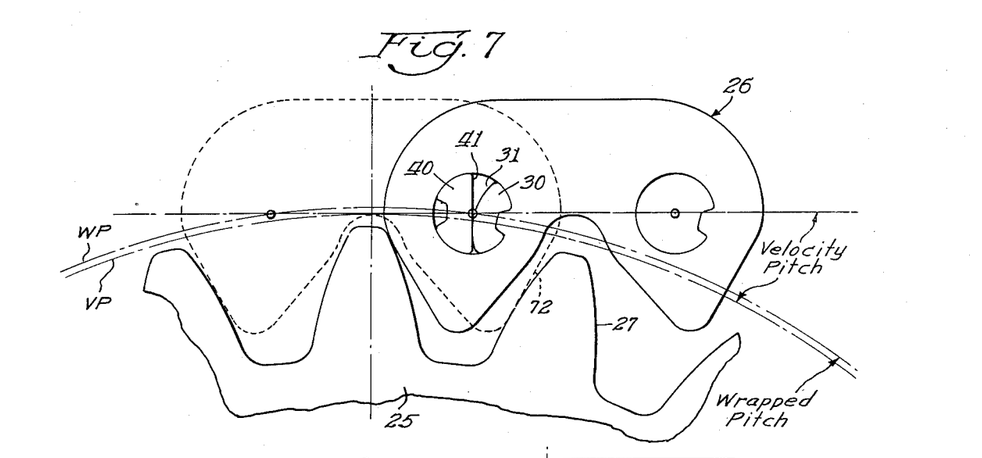
Fig. 7 illustrates the relative position of a chain and sprocket embodying the features of this invention, said chain being shown before articulation has taken place.
Figure 8:
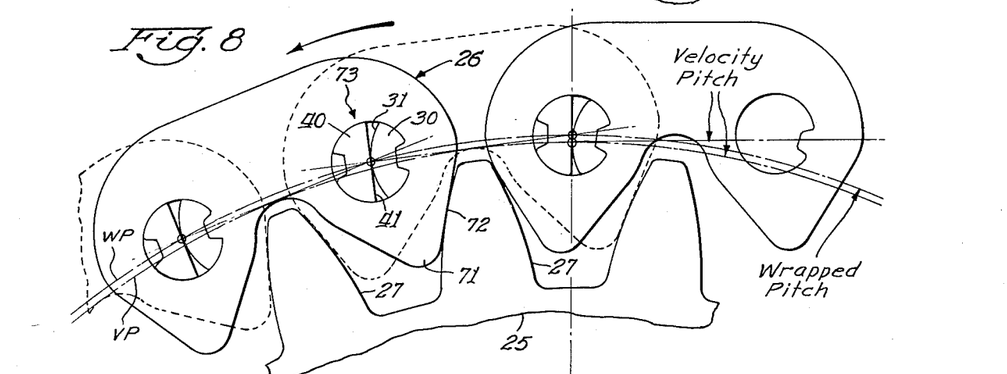
Fig. 8 depicts a chain embodying the features of the present invention and defines the relative movement of the chain after articulation has taken place and the chain is being wrapped upon the sprocket.

At the time that the chain has reached its point of tangency as shown in Fig. 7, articulation has not been completed and to fully flex the joint and wrap the sprocket, the link must assume a position with respect to the sprocket teeth which places the pitch point of the chain again at the point of largest effective radius. It is this portion of the time which is between the points of tangency and the time at which the chain is fully wrapped that the speed change hereinbefore discussed actually occurs. It might be said that there are two effective pitch circles in a chain and sprocket combination of this type, one being the actual velocity of the chain, the other being the wrapped pitch of the chain on the sprocket, the latter being the larger. This is shown in Fig. 7 with the minor or velocity pitch being shown as VP and the major or wrapped pitch being WP.

The conjugate action of the instant chain (Fig. 18) coupled with the instant specifically designed pintles 30 and 40 and their combined coaction as taught by this invention is the means of accomplishing the change in effective chain and sprocket pitch in a power transmisison chain of the silent or inverted tooth type while accomplishing all of the other desirable objectives in obtaining true tangetnial approach and departure to and from the sprocket.

It will be understood that if a chain were made with joint parts or pintles having practically zero clearance, the change in pitch which has been hereinbefore described could not take place. Otherwise stated, if the chain and sprocket were designed of proportions such as to acquire the true gear action and with minimum joint clearance it would be found that the chain would not wrap the sprocket because of the increase in effective pitch diameter of the chain when wrapped and the resulting greater chordal distance between the chain joints.

Heretofore, it has been necessary to compromise on the design of all chains having minimum joint clearance. In other words, the sprocket has been merely cut to a smaller pitch diameter which will allow the chain to wrap, but in doing so, the true desired action is lost and some chordal effect is experienced.

If, after the midway point of joint flexure has been reached, the chain is made to increase in pitch or distance between the joints during the rest of the joint flexure as contemplated by this invention, the desirable condition of a true gear rack combination and suitable chain sprocket wrapping characteristics are obtained.

In this invention the new and improved chain joint 73 employed in combination with the gear type sprocket 25 and a rack-shaped chain link 26 is of such a design that as flexure takes place the pitch of the chain actually elongates. This is accomplished by means of the contemplated chain joint in which a pin 30 having a curved surface 31 in contact with a pin 40 having a straight surface 41 comprises the chain joint 73 as shown in Figs. 7, 8, 9, 10 and 11. The pin 30 having the curved surface 31 is tilted in such a manner that the contact between the curved pin or rocker and the flat seat pin is at a point considerably below the original line of the chain. As the chain joint flexes the contact point moves upward due to the rocker-like action and the pitch of the chain elongates (Figs. 20 through 27), the amount of pitch elongation being calculated to just equal the pitch elongation that is necessary to wrap the chain upon the sprocket.

Figure 9:
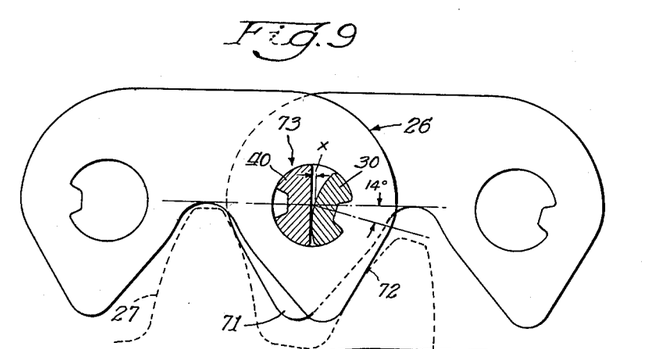
Fig. 9 illustrates a chain embodying the features of the present invention and is shown with the pintles at zero flexure.
Figure 10:
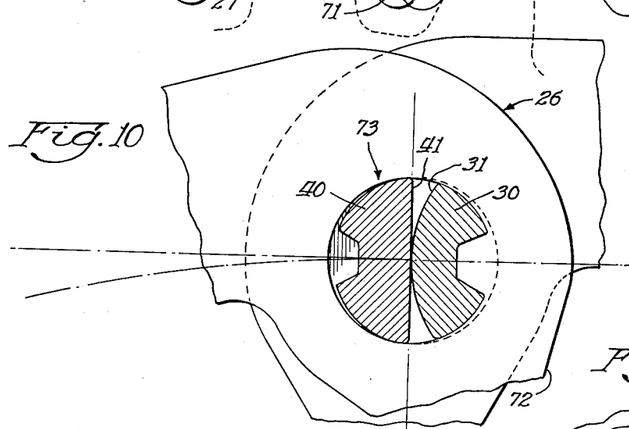
Fig. 10 is an enlarged view of a portion of the chain illustrated in Fig. 9 and showing the pintles at partial flexure.
Figure 11:
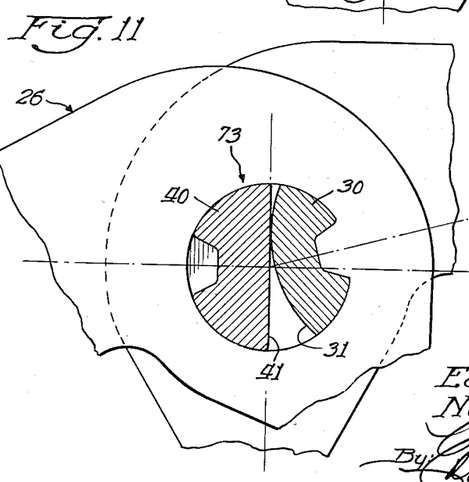
Fig. 11 is an enlarged view of a portion of the chain illustrated in Fig. 9 and showing the pintles at extreme flexure for the sprocket disclosed.
Figure 15:
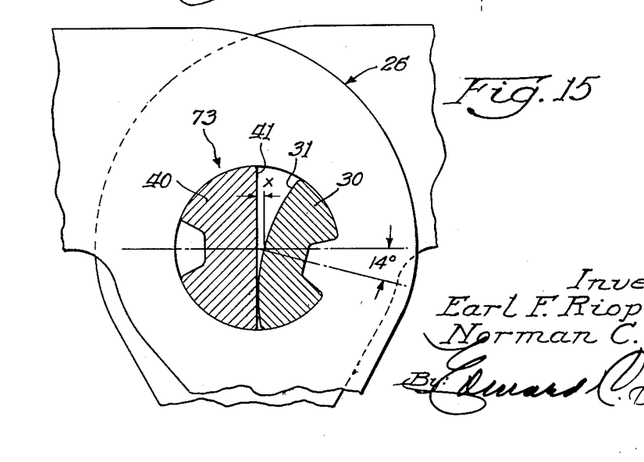
Fig. 15 is an enlarged view of a portion of the chain illustrated in Fig. 9 and showing the pintles of the chain at zero flexure.

In Fig. 7 the joint 73 comprising pins 30 and 40 is shown in a position which corresponds to the straight or pulling position of the chain. In Fig. 10 the joint 73 is illustrated in a flexed position to the amount necessary to wrap the chain around the sprocket teeth. The distance X in Figs. 9 and 15 is the amount that the joint increases the pitch of the chain as it wraps upon the sprocket.

It will be noted that the angular displacement of the curved joint pins 30 with respect to the longitudinal pitch line will determine the minimum number of sprocket teeth 27 with which the chain can be used. In the drawings, the rocker pin 30 has been tilted 14 degrees (Fig. 15) making a total angular movement of 14 degrees possible before the chain has reached its maximum pitch. This will limit the number of teeth upon which the correction will occur to 25 teeth because 360 degrees over 25 degrees 14.4 degrees. It is notable that this limitation is not serious for this type of power transmission chain as modern practice dictates larger numbers of teeth in the sprockets. Moreover, it would be possible to design this chain so that a smaller number of sprocket teeth could be used, say as low as 19, merely by tilting the joint element more than shown.

Actual tests have repeatedly demonstrated the effectiveness of this invention. It was found during the research that while either the joint described employed with a conventional chain, or, the chain described employed with a conventional joint, were somewhat effective in reducing chordal shock; however, the combination of the two virtually doubled the chain power transmitting capacity with a corresponding reduction in noise, vibration and heating.

It was also found that by stroboscopic examination of the instant chain operating at high speeds and under extremely heavy loads heretofore impracticable for silent chains, that the action described above actually takes place and can be observed with the naked eye.

Figure 12:
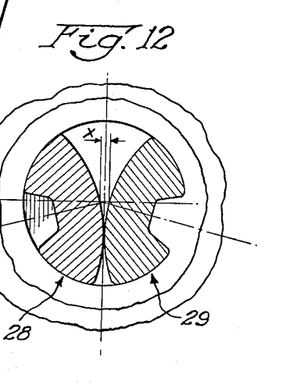
Fig. 12 illustrates a pair of pintles of modified form contemplated by this invention.
Figures 13, 14, 16, 17:
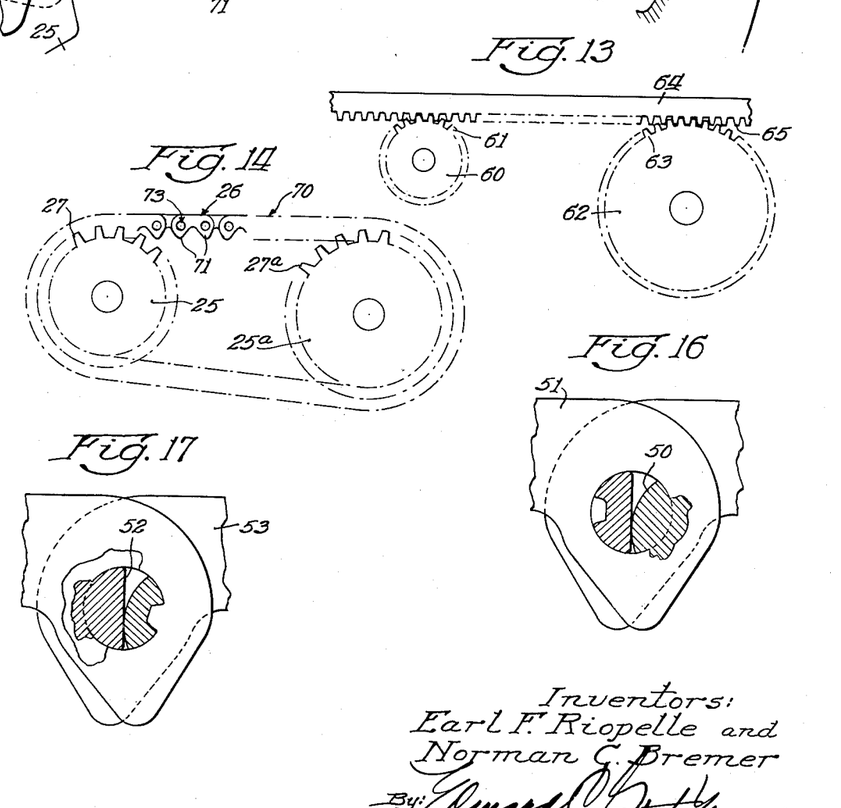
Fig. 13 illustrates a pair of sprockets of different diameter operatively associated with a rack to depict an ideal chain action.
Fig. 14 shows a driving sprocket, a driven sprocket and an endless chain cooperating therewith.
Fig. 16 illustrates a modified form of pintles.
Fig. 17 depicts a portion of a chain contemplated by this invention with a pintle of modified form.

While the description and drawings have dealt with a chain having a flat pin as at 40 and a curved pin as at 30 cooperating therewith, it should be appreciated that the required pitch elongation as the chain wraps upon the sprocket as at 25 could be accomplished by other methods as, for example, with a chain joint having two curved pins 28 and 29 as illustrated in Fig. 12, or, a joint in which the curved surface 50 is integral with the link 51, or a joint in which the flat surface 52 is integral with the link 53, respectively illustrated in Figs. 16 and 17.

Also, within the spirit of this invention is the combination of the pitch elongating joint as hereinbefore described and a link having curved tooth engaging surfaces and a sprocket engaging the chain having straight-sided teeth, the effect of which could be made to be the same as that of the disclosed curved sprocket teeth 27 when employed with links as at 26 having straight-sided teeth.

Having thus described the general theory upon which the structural features of this invention are based, the specific details of construction necessary to accomplish the aforementioned desirable results will now be described in detail.

Referring first to Fig. 13, there is shown a driving sprocket 60 having teeth 61, a driven sprocket 62 having teeth 63, and a rack 64 of infinite length having teeth 65 cooperating with teeth 61 and 63. It is well known that substantially uniform rotation may be transmitted from the driving sprocket 60 to the driven sprocket 62 if the involute system of gear cutting is used. By this system, teeth 65 of rack 64 are made straight sided with a predetermined pressure angle, and the teeth of the driving sprocket 60 and the driven sprocket 62 are then cut from a hob having a profile of rack 64. If the rack 64 is of infinite length, the driving sprocket 60 can drive driven sprocket 62 as long as is desired.

Attention is now directed to Fig. 14 wherein there is shown the sprocket 25, which may be considered the driving sprocket, and a driven sprocket 25a having teeth 27 and 27a respectively. Wrapped around both sprockets is an endless chain 70 which is comprised of a plurality of individual links as at 26 having teeth 71 on the inner surface thereof, and connected together by means of pins indicated in their entirety by the numeral 73. It is obvious that the portion of the chain 70 located between the sprocket and commonly called the strand, resembles rack 64 illustrated in Fig. 13.

It is particularly notable that prior to this invention it had been customary to design teeth 71 of link 26 with reference to a particular sprocket, so that the tooth action varies with the number of teeth in the sprocket. According to this invention, however, teeth 71 insofar as the sides of the teeth are concerned, are given the contour of teeth 65 of rack 64, that is, teeth 71 are made straight sided, the angle of the sides being determined from the sprocket having the minimum number of teeth which is to be cooperated therewith. We have found that the minimum pressure angle to be used in the tooth profile design is preferably 30 degrees. Teeth 27 and 27a although appearing on sprockets of different diameters, may be cut with the same hobbing equipment, because of the rack design of chain 70, and the use of the involute system in designing the profile of teeth 71.

To illustrate what we mean by generating the sprocket teeth 26 to give a conjugate working surface with respect to the working surface 72 of chain teeth 71, imagine a gear shaper with a cutter shaped exactly as the chain tooth, the cutter reciprocates along its axis of rotation and rotating in unison with a lead strip fed tangentially to it and guided around it. If the linear velocity of the generating pitch line of the cutter be identical with that of the forward movement of the strip, and if the cutter reciprocates at a uniform rate, this cutter, as the strip winds about it, will cut or generate tooth profiles in the lead strip as it enters on one side and as it leaves on the other, such tooth profiles on the strip being so related to the cutter that if the cutter drives an identical strip as a flexible rack, for that is what a silent chain is, there will be no appreciable chordal action and no effective differential speed between the chain and the cutter. This is so because, instead of each tooth picking up the load, and pushing the chain forward and dropping the chain and leaving it for the next tooth to come on, the conjugate relation between the sprocket tooth and the chain tooth will result in giving the chain a substantially uniform forward movement substantially equivalent to the tangential speed of the gears at the pitch diameter. By conjugate surfaces, we mean tooth profiles which are of such form that one will drive the other with a constant velocity, that is, the ratio of the angular velocity of the driver to that of the driven is constant.

Attention is now directed to Figs. 20 through 27 wherein the pitch circle illustrated may be defined as a function of the sprocket and the chain, and remains constant at all times for any given set of conditions. The pitch circle defines a circle whose center is the axis of rotation of the sprocket and whose periphery circumscribes a polygon whose sides are equal to the pitch of the chain and the number of whose sides equals the number of teeth in the sprocket.

The pitch of the chain indicated as P is the distance between the pivot centers of the links. In the event of chain wear, or if it stretches under load or centrifugal force, the pitch P increases, thereby to reflect an increase in the diameter of the pitch circle; however, any change in the diameter of the pitch circle resulting from wear is a gradual change extending throughout the life of the chain while the change in the pitch diameter resulting from load upon the chain or from centrifugal force, remains constant or fixed for any given load and speed.

In this connection it is important to understand that there is no appreciable variation in the pitch circle diameter during normal operation and no fluctuation of the position of the pitch circle, along a tangent line to which the chain must enter and leave the sprocket during operation. Accordingly, as the pitch of the chain increases the individual links will ride further out in the sprocket teeth. Thus, it appears that the only result of an increase in the pitch or length of the chain is to cause the chain teeth to engage the sprocket farther out from the center, without any other change in tooth relationship.

Figure 18:
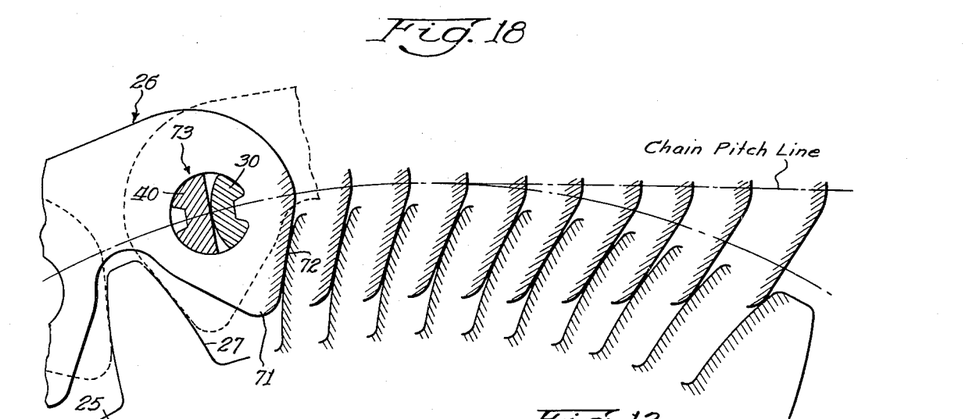
Fig. 18 is a diagrammatic view of the chain contemplate by this invention and illustrating the tooth action.
Figure 20:
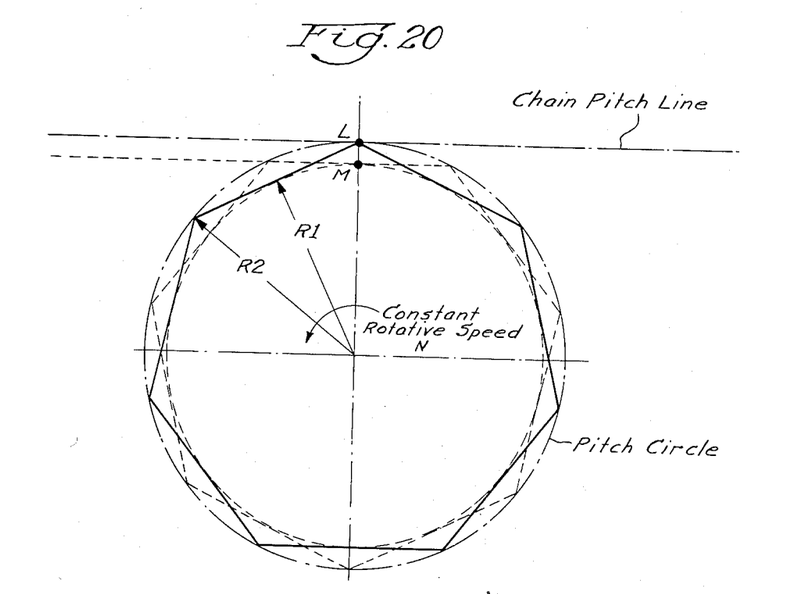
Fig. 20 diagrammatically illustrates the relative disposition of the pitch circle and the chain pitch line when employing the instant chain.
Figure 21:
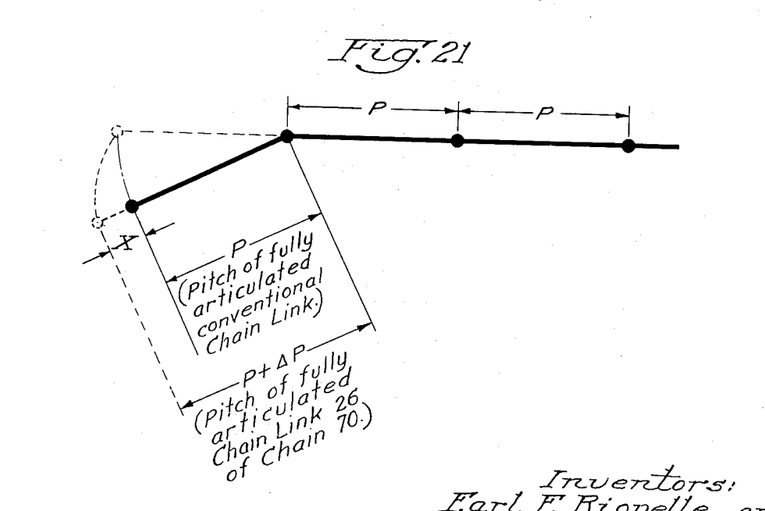
Fig. 21 diagrammatically illustrates in linear form the characteristics and degree of elongation of the instant chain when being wrapped upon a sprocket.
Figure 22:
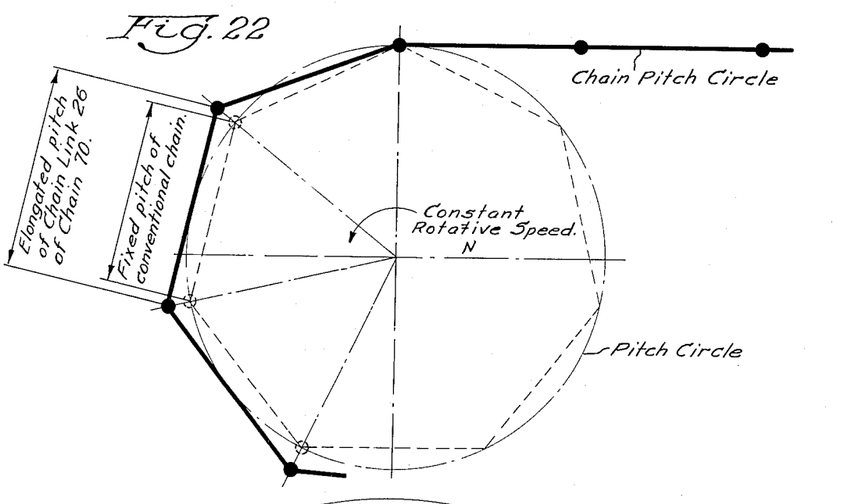
Fig. 22 diagrammatically illustrates the relative disposition of the pitch circle and the chain pitch line and illustrating the degree of elongation of the chain when being wrapped upon a sprocket.

In Figs. 18, 20 and 22 it can be seen that when a chain tooth as at 71 approaches a sprocket tooth as at 27 to which it is conjugate it is held up in position on the chain pitch line, which is the line tangent to the pitch circle, by contact with a sprocket tooth. Heretofore, conventional chain teeth engaging sprockets not employing the principles of conjugate action contemplated by this invention, will either lie inside or outside the profile of the generated surface. If it lies inside, the chain tooth will be so positioned as to locate the link pivot somewhere between the chain pitch line and the center of the sprocket at the time contact with the sprocket tooth is established. If the working surface lies outside the generated surface, the link pivot will be positioned somewhere beyond the tangent when sprocket contact is established. In either event this results in displacing the link pivot at one side or the other of the pitch circle and normal pitch line as the chain enters the sprocket and subsequently conforms to the pitch circle, thus the objectionable chordal action described hereinbefore is set up. This same reasoning applies to the chain leaving a sprocket. Moreover, in Fig. 20 there is diagrammatically illustrated the fluctuation of conventional chain and sprockets between the pitch circle and the normal pitch line.

It is deemed important for a clear understanding of the functions of the present invention to establish definitions of working surfaces of the chain links. By working surfaces as indicated at 72 in Fig. 18 we mean those surfaces on the chain tooth and on the sprocket tooth which come together to establish a driving relation between the chain and sprocket. By outside contact we mean a chain and sprocket relation wherein the working surfaces on the chain are at the ends of the link and wherein the working surfaces on any chain link are located beyond the pivot points of the links. Accordingly, the present invention teaches the construction of an outside contact link.

It is notable that the curves for the contact surface or surfaces of a sprocket tooth obtained by the method herein described are conjugate to the original tooth form and the links have with the sprocket teeth the characteristic progressive rolling and sliding action which affords the desired constant velocity conditions in both the driven and driving elements. The desired conditions for ideal drive assumed as a basis for the processes of generation are thus reproduced when a sprocket having teeth designed after the manner herein described has operatively disposed thereon a chain composed of links having teeth of the form used for generation.

In Figs. 18, 20 through 27, it can been seen that chain and sprocket combinations made in accordance with this invention by the incorporation therein of the combined co-action of the specifically defined link joint as at 73 together with the generated conjugate tooth surfaces of the chain and sprocket, have certain highly desirable characteristics in that chordal action is practically eliminated, and the chain enters the sprocket with constant linear velocity for any given constant angular velocity of the sprocket. The specific design of the chain pins 30 and 40 of the chain joint 73 permit no deviation from the pitch line upon entering the sprocket by reason of the aforesaid progressive contact action co-acting with the action of the joint 73. This is clearly illustrated in Fig. 18 which indicates how the contact between the surfaces of the link and sprocket teeth holds the entering chain link in a position such that the points of initial articulation enter the sprocket on a line tangent to the pitch circle. Elimination of chordal action results in a material reduction of the stresses set up in the link structure, affords extreme smoothness in operation and largely reduces noise.

The instant chain structure possesses another important characteristic in that impact between the links and sprocket upon engagement is substantially eliminated. This is due for the most part to the conjugate character of the contacting surfaces. As can be seen in Fig. 18, when the link enters the sprocket, the paths traced by the contact points on both link and sprocket teeth 71 and 27 are practically co-incident, and the initial contact is accordingly gradual and gentle and entirely lacking in impact characteristics.

The conjugate and contacting surfaces materially and favorably affect the running and wearing characteristics. The contact surfaces 72 of the chain link and the contact surfaces of the sprocket teeth 27 are of such form that regardless of what portion thereof may be used within lengths practical for the link and sprocket construction, the action between the link and sprocket tooth remains due to wear in the joints or from other causes, therefore, has practically no effect upon the action of engagement and disengagement of the link and sprocket teeth. Elongation of the pitch of the chain due to wear should not be confused in this particular case with elongation of pitch of the chain contemplated by this invention by the co-action between the pins 30 and 40 when the chain is being wrapped upon a sprocket as illustrated diagrammatically in Figs. 20 through 27. Otherwise stated, the invention contemplates a chain joint as at 73 providing elongation of pitch only under certain circumstances, that is to say, when the chain is being wrapped upon the sprocket as illustrated in Figs. 20 through 27.

Attention is next directed to Figs. 20 through 27 wherein thereis diagrammatically illustrated the relative reaction between the chain and sprocket contemplated by this invention. In Fig. 20 it can be seen that in a conventional chain drive the point of tangency is constantly varying between points L and M. Otherwise stated, the effective radius is constantly varying between $R_1$ and $R_2$. In the chain contemplated by this invention the point of tangency is constant at point L and the effective radius remains constant at $R_2$.

Mathematically speaking, in a conventional chain drive the linear speed of the chain pulsates. It is slower over the short radius and faster over the long radius. Also, the chain rises and falls over the varying radius. This may be calculated as follows:

$$V = 2\pi RN$$

and R will always be variable.

In the chain contemplated by this invention the linear speed of the chain is constant because the effective radius is always the same. Also, chordal rises and fall are eliminated. This may be calculated as follows:

$$V = 2\pi RN$$

and R is always constant.

Thus, it can be seen that constancy of effective radius results in a constant linear speed with no chordal rise and fall, this being accomplished by the combined reaction of the joint 73 coupled with the conjugate tooth profile of the chain and sprocket contemplated by this invention. The principles of co-action of the instant chain and sprocket construction embraces a chain joint permitting gradual elongation of the pitch of the chain as it articulates in engaging the sprocket, this feature being diagrammatically illustrated in linear form in Fig. 21 where it can be seen that the pitch P of a fully articulated conventional chain link remains the same while the pitch of the fully articulated chain link 26 of the chain 70 elongates a distance X also shown in Figs. 9 and 15.

In order to accomplish this result and to provide for the elongated pitch contemplated by this invention, the instant chain wraps the sprocket outside the pitch circle as illustrated in Fig. 22 in full lines, while the conventional chain wraps the sprocket inside the pitch circle as indicated by the dotted lines. Thus, it can be seen that when the instant chain is fully articulated a line drawn through the centers of the joints will be tangent midway thereof with the pitch circle of the sprocket.

Figure 23:
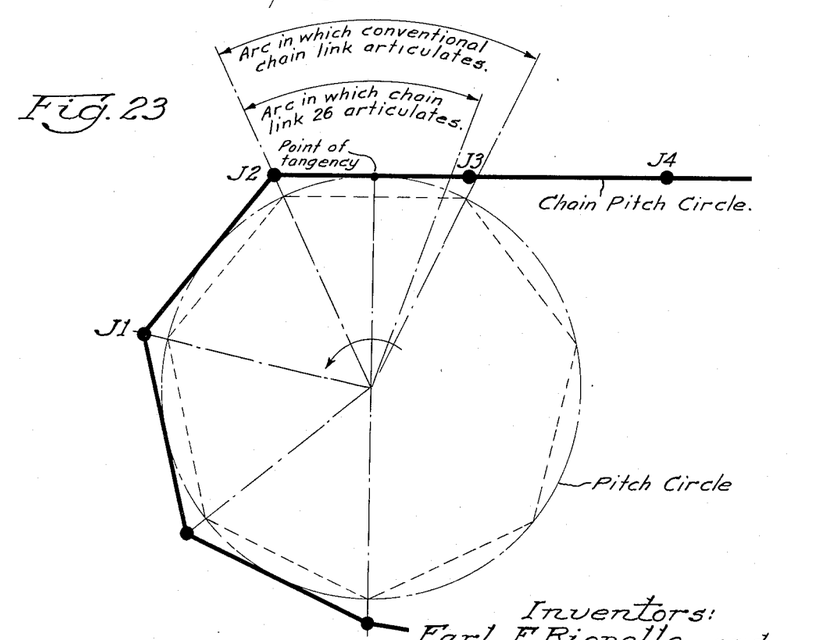
Fig. 23 diagrammatically illustrates the relative disposition of the chain pitch line with respect to the pitch circle just before articulation of the chain takes place.

Since the instant chain, where it is engaged by the sprocket, is always tangent to the sprocket on the pitch circle, its articulation begins a few degrees later than that of a conventional chain as illustrated in Fig. 23. For purposes of illustration in Figs. 23 through 27 the chain joint 73 has been indicated J1, J2, J3, J4 and J5. The relative disposition of these joints when being wrapped upon a sprocket will now be described in stages.

Figure 24:
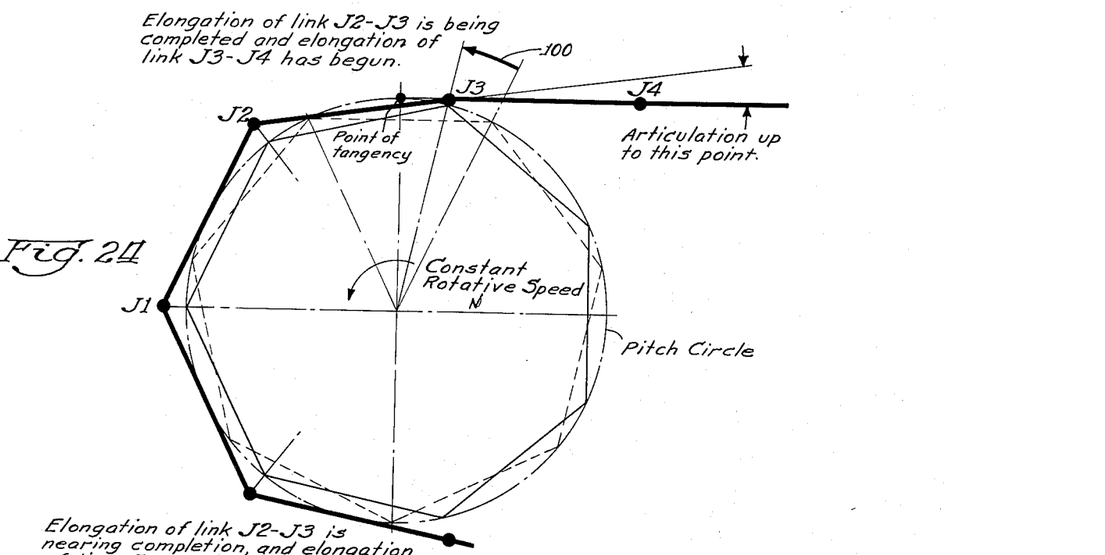
Fig. 24 is a continuation of the showing of Fig. 23 with the sprocket rotated slightly to illustrate initial articulation taking place.

In Fig. 24 the sprocket, which rotates at a constant speed is shown moved forward a distance indicated by the arrow 100 and it can be seen that elongation of link J2—J3 is being completed and elongation of link J3—J4 has begun.

Figure 25:
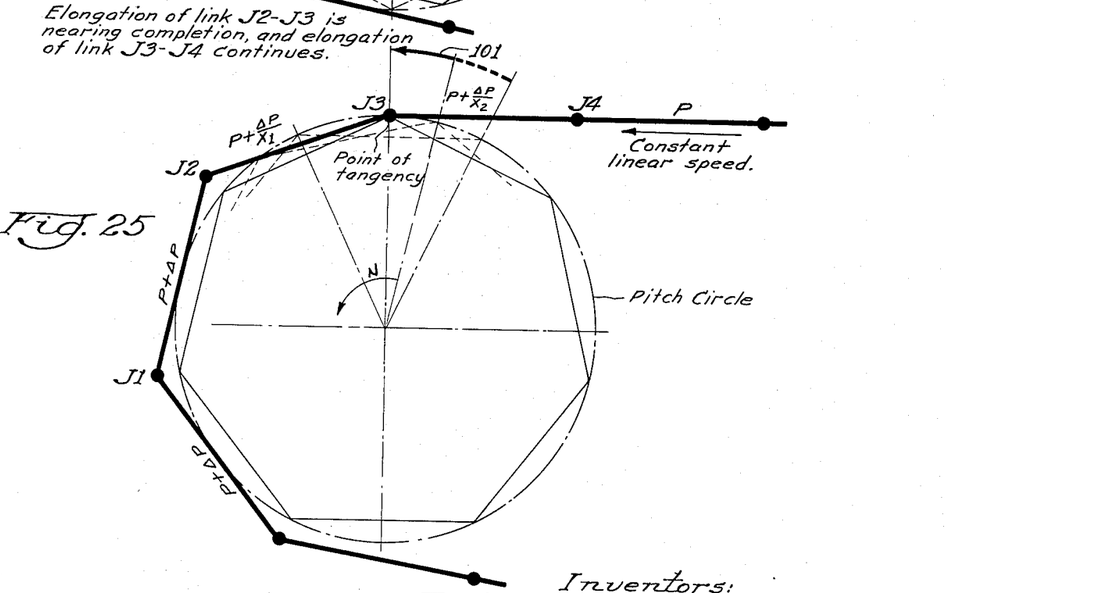
Fig. 25 is a continuation of Fig. 24 showing the sprocket rotated further with articulation nearing completion.

In Fig. 25 it can be seen that the sprocket has been rotated further a distance indicated by the arrow 101 and elongation of link J2—J3 is nearing completion and elongation of link J3—J4 continues. The mathematical formulas for calculating the pitch of the respective links is indicated. Thus, it can be seen that prior elongation of link J2—J3, due to articulation of joint J2 maintains the point of tangency on the pitch circle and that elongation of the instant chain link maintains the chain at a constant linear speed when passing through the arc in which a conventional chain would normally be accelerating in speed.

Figures 26, 27:
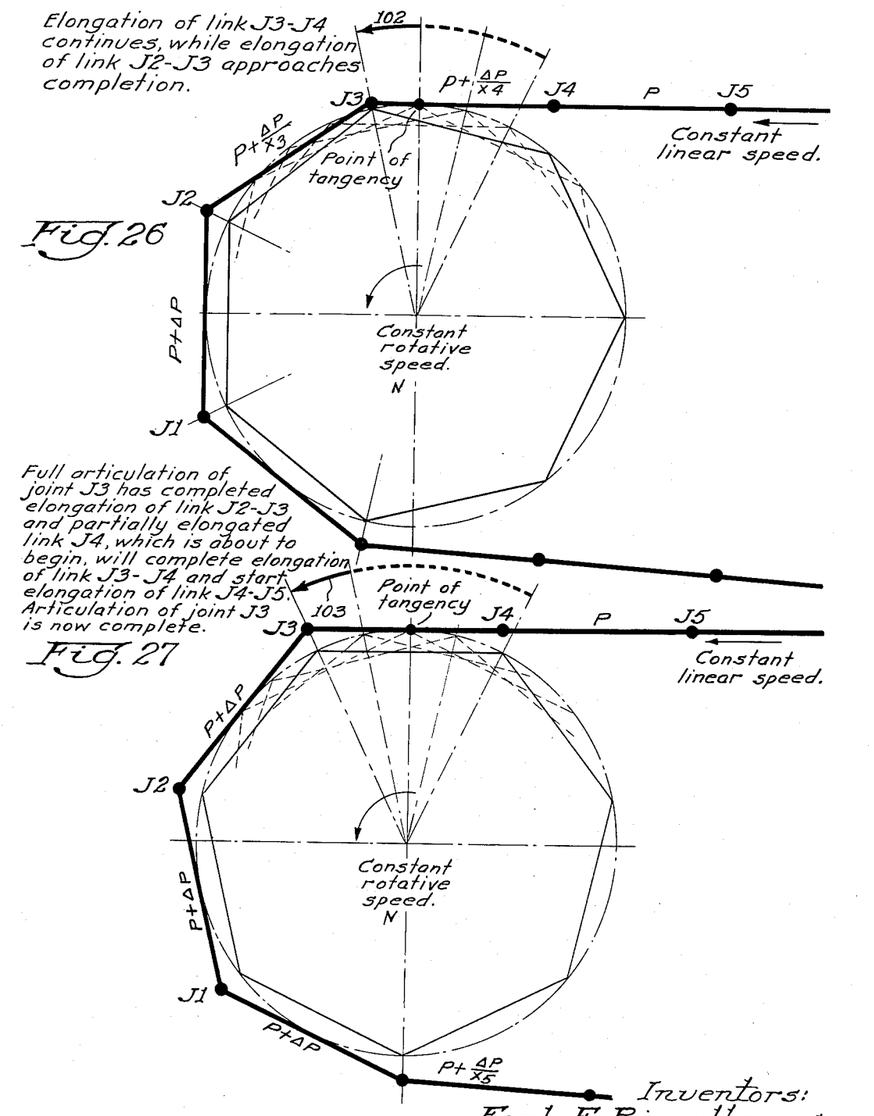
Fig. 26 is a continuation of Fig. 25 showing the articulation and elongation of the chain link completed with initial articulation beginning at the joint of the next link following.
Fig. 27 is a continuation of Fig. 26 showing the complete articulation and elongation of two links with initial articulation taking place in the third link.

In Fig. 26 the sprocket has been rotated forward at a distance indicated by the arrow 102 and elongation of link J3—J4 continues while elongation of link J2—J3 approaches completion. It also is important to note that elongation of link J2—J3 maintains a constant linear speed by holding link J3—J4 out to tangency at the pitch circle of the sprocket when passing through the arc in which a conventional chain would normally be decelerating in its speed.

Attention is now directed to Fig. 27 which shows the sprocket further rotated a distance indicated by the arrow 103 and that full articulation of joint 13 has completed elongation of link J2—J3 and has partially elongated link J3—J4, while articulation of joint J4 which is about to begin, will complete elongation of link J3—J4 and start elongation of link J4—J5. In the instant chain, pitch elongation of the chain as it is engaged by the sprocket is accomplished by the articulation of each joint in turn which is effective to maintain the point of tangency of the chain, as indicated, at the pitch circle of the sprocket, thus keeping the effective radius of the drive constant. Otherwise stated constant effective radius plus constant rotative speed equal constant linear speed.

It is well known in the chain art that roller chains are applied in power transmission services requiring relatively low speed operation with relatively heavy loads, while silent chains have been applicable in power transmission services requiring relatively high speed operation with relatively light loads. Thus, it appears that neither of the present day chains would be applicable for high speed operation under relatively high load conditions. Such conditions presently prevail in oil well hoist power transmission requirements, say, for example, the transmission of power of a 2,000 horsepower direct current motor to a draw works drum shaft on a new type of electric drilling rig. Width, speed and ratio specifications coupled with the horsepower requirements of this class of service as well as other oil field drives are such that heretofore published and available rating data for silent chain is utterly useless. Otherwise stated, in most cases it has been found that to handle most oil field work a silent chain would have to operate twice as fast as heretofore considered practical and with loads three times those set forth in published and available rating data for silent chains, thereby necessitating the delivery of six times the usual power requirements. Moreover, in such applications the maximum load upon the chain will take place at stalling speeds and that very heavy loads are realized at relatively low rotative sprocket speeds.

Although the instant chain has been found advantageously applicable to the aforementioned class of service, it is understood that the instant chain can advantageously fulfill power transmission requirements in other applications wherever design requirements of the chain call for relatively high speed operation under relatively heavy load conditions.

A geometirc study of prior art chain constructions indicated that the force creating the objectionable slipping tendency between contact points of pintles was caused by the fact that the radii of the curved joint surfaces did not always coincide with the line action of the chain. In other words, when the joint flexed and the rocker contact point shifted, the tangency points of the rockers were not perpendicular to the chain pitch line and thereby a vertical force component was generated which was equal to:

$$TAN \frac{360}{N} \times Chain\ Pull$$

In this connection attention is invited to Figs. 10 and 15 which respectively show the relative disposition of the chain pins 30 and 40 in straight line and flexed conditions. In these two views it can be seen that the tangency points of the rockers are always perpendicular to the chain pitch line regardless of the fact that the chain is in its straight line position or in its flexed position thereby eliminating the vertical force component hereinbefore mentioned. For best operation. it is desirable that the tangency points between the flat face 41 and the curved face 31 of the chain pins be located at points ranging between those shown in Fig. 15 and Fig. 10 in which full flexure of the chain is shown and which is normally applicable when the instant chain is wrapped upon a sprocket.

Figure 19:
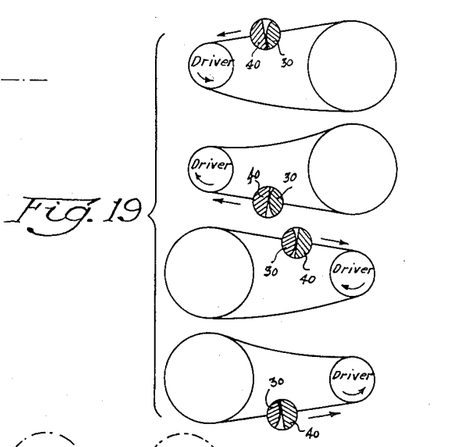
Fig. 19 incorporated several views of different drive arrangements employing the instant chain and illustrates the proper method for determining the respective positions of the pintles when mounting the chain on different sprocket arrangements.

In Fig. 19 there is shown several different drive arrangements and it has been found for best operation to mount the instant chain upon the sprockets so that the curved surface of the rocker pin 30 faces the direction of the movement of the chain toward the driver sprocket.

A rocker joint as at 73 embodying a flat seat pin as at 40 and a curved rocker as at 30 and employed in combination with an outside engagement driving link 26 having teeth 71 with the working surfaces thereof and the working surfaces of a mating sprocket being conjugate each with the other, is ideally adapted for extreme high speed operation with relatively heavy load requirements.

The instant chain and the links thereof being formed of simple parts and readily available materials lends itself to mass production manufacturing principles, thus affording a substantial saving in the manufacturing costs.

From the foregoing disclosure, it may be observed that we have provided an improved silent chain incorporating an improved chain joint cooperating with conjugate mating of teeth of the chain and sprocket to provide a chain readily adapted for extreme high speed operation with relatively heavy load requirements and which efficiently fulfills the objects thereof as hereinbefore stated and which provides numerous advantages which may be summarized as follows:

1. Structurally simple, efficient and durable;
2. Economical to manufacture and readily adaptable to mass production manufacturing principles; and
3. The provision of an improved silent chain having structural features thereof effective to eliminate the heretofore objectionable chordal action thus to effectively increase the life of the chain and also advantageously permit employment of the chain to power transmission services requiring extremely high speed operation under extremely heavy load conditions heretofore found impracticable with conventional silent chains known to the art.

While we have illustrated preferred embodiments of our invention, many modifications may be made without departing from the spirit of the invention, and we do not wish to be limited to the precise details of construction set forth but wish to avail ourselves of all changes within the scope of the appended claims.

We claim:

1. In a chain drive the combination of a sprocket having teeth generated from a hob having the toothed profile of a rack, and a chain cooperating with the sprocket and comprising toothed links having the rack tooth profile of the hob from which the sprocket teeth were generated, each of said links having pin apertures, and pivot pins in said pin apertures and effective to connect the links, said pins comprising two parts one rockable upon the other, the point of contact between the two parts of the pin during straight line pull of the chain being located radially inward of the chain pitch line and also the center of the pin aperture, and said links being articulated responsive to wrapping of the chain on the sprocket whereby the two-part pin will rock to move said point of contact radially outwardly.

2. In combination, a sprocket, and a chain comprising a plurality of articulated toothed links engaged with the sprocket teeth, each of said links having pin apertures, the opposed working surfaces of the teeth of the chain and the sprocket acting in conjugate relation the one to the other, and two-part pivot pins in said pin apertures and having confronting bearing rocking surfaces acting in cooperation with the aforesaid conjugate relation of the working surfaces of the teeth and the sprocket thereby to elongate the pitch line of the chain during progressive articulation of the chain while being wrapped on said sprocket, the point of contact between the two parts of the pin during straight line pull of the chain being located radially inward of the chain pitch line and also the center of the pin aperture, and said links being articulated responsive to wrapping of the chain on the sprocket whereby the parts of the pin will rock with respect to each other effective to shift said point of contact to the opposite side of the chain pitch line.

References Cited in the file of this patent

UNITED STATES PATENTS

| | | |
|---|---|---|
| Re. 12,844 | Morse | Aug. 18, 1908 |
| 1,405,145 | Morse | Jan. 31, 1922 |
| 1,678,450 | Sturtevant | July 24, 1928 |
| 1,692,799 | Sturtevant | Nov. 20, 1928 |
| 1,755,887 | Morse | Aug. 22, 1930 |
| 1,887,137 | Morse | Nov. 8, 1932 |
| 1,919,768 | Brandt | July 25, 1933 |
| 2,096,061 | Perry | Oct. 17, 1937 |
| 2,226,010 | Moorhouse | Dec. 24, 1940 |
| 2,602,344 | Bremer | July 8, 1952 |

FOREIGN PATENTS

| | | |
|---|---|---|
| 293,937 | Great Britain | July 19, 1928 |